United States Patent
Barbeau et al.

(10) Patent No.: US 6,627,236 B1
(45) Date of Patent: Sep. 30, 2003

(54) METHOD FOR MAKING DAIRY PRODUCT CAPSULES

(75) Inventors: Jean-Yves Barbeau, Brive-la-Gaillarde (FR); Pierre Gauthier, Orsay (FR); David Lam, Montesson (FR); Olivier Noble, Orsay (FR)

(73) Assignee: Compagnie Gervais Danone, Levallois-Perret (FR)

( * ) Notice: Subject to any disclaimer, the term of this patent is extended or adjusted under 35 U.S.C. 154(b) by 0 days.

(21) Appl. No.: 09/830,890

(22) PCT Filed: Nov. 2, 1999

(86) PCT No.: PCT/FR99/02669

§ 371 (c)(1),
(2), (4) Date: Aug. 8, 2001

(87) PCT Pub. No.: WO00/25597

PCT Pub. Date: May 11, 2000

(30) Foreign Application Priority Data

Nov. 2, 1998 (FR) .............................................. 98 13752

(51) Int. Cl.$^7$ ................................................. A23C 9/00
(52) U.S. Cl. ........................ 426/89; 426/103; 426/277; 426/573; 426/580; 426/583
(58) Field of Search .......................... 426/89, 103, 277, 426/573, 575, 576, 577, 580, 583, 586, 587

(56) References Cited

U.S. PATENT DOCUMENTS 4,375,481 A    3/1983   Kuwabara et al. ............ 426/93

FOREIGN PATENT DOCUMENTS

| DE | 2 402 415 | | 7/1974 |
| EP | 0 048 123 A1 | | 3/1982 |
| JP | 58-20176 | * | 2/1983 |

OTHER PUBLICATIONS

JP58063373, Liquid Food Contain Granule Capsule Manufacture Cooling Mixture Food Coagulate Option Anticoagulant Regulate PH Forming Granule Cooling Oil, Apr. 15, 1983 (Abstract Only).
JP58020176, Mixing of Different Edible Capsule Balls, Their Treatment, and Line Plant, Feb. 2, 1983 (Abstract Only).

* cited by examiner

*Primary Examiner*—Leslie Wong
(74) *Attorney, Agent, or Firm*—Morgan, Lewis & Bockius

(57) ABSTRACT

The invention concerns dairy product capsules and the method for making them. The capsules contain a coating including a food polymer, reactive to multivalent ions, inside which is confined a dairy product. The capsules are characterised in that they have a breaking force higher than 0.5 N. The invention is applicable in the food processing industry.

10 Claims, 2 Drawing Sheets

METHOD FOR MAKING DAIRY PRODUCT CAPSULES

The invention relates to dairy product capsules comprising an envelope inside which said dairy product is confined, and to a process for manufacturing these capsules.

The coating of yogurt in a dietary polymer (sodium alginate) by the technique of dripping yogurt into alginate solution is already known (Japanese patent application in the name of Meiji Milk Prod. Co. Ltd., published under No. 62-130 645): it is indicated in said document that spherical capsules (yogurt beads) are thus obtained.

However, the yogurt capsules obtained according to said Japanese patent application have many drawbacks which considerably limit their possibilities for industrial and commercial exploitation:

- it is difficult to coat a fluid dairy product in capsules: all the examples mentioned in the above-mentioned Japanese patent application recommend using a yogurt whose viscosity is high, greater than 2000 mPa·s at 10° C.;
- their alginate envelope, which is readily deformable, does not allow their spherical shape to be maintained. They are also very fragile; they break so easily that their handling, in particular during manufacture and packaging, is made very difficult, if not impossible, at an industrial scale;
- they are subject to the phenomenon of syneresis, i.e. the exudation of liquid at the surface of the capsule. This phenomenon results in surface irregularities, and also creates an environment that is favorable to microbial growth, which is detrimental to the storage of the beads.

To overcome these drawbacks, it is proposed, in patent application 62-130 645, to immerse the capsules, as they are formed, into an aseptic or antiseptic solution or a sugar solution, and to leave them therein in order to preserve their spherical shape.

The Inventors thus set themselves the aim of providing strong, stable dairy product capsules which do not need to be immersed in a storage solution, and which are also found by consumers to have a pleasant mouthfeel, and investigated coating polymers which would allow this aim to be achieved.

They have thus found that the selection of coating polymers on the basis of their breaking force makes it possible to obtain capsules that have the desired properties.

One subject of the present invention is thus a capsule comprising an envelope comprising at least one polymer for dietary use, which is reactive with multi-valent ions, inside which is confined a dairy product, characterized in that said capsule has a breaking force of greater than 0.5 N and preferably between 0.5 N and 1.5 N.

For the purposes of the present invention, the expression "polymer which is reactive with multivalent ions" means a polymer for dietary use which can react chemically with multivalent ions (in the present case, these are ions which have lost more than one electron) to form a crosslinked network (irreversible chemical crosslinking) in the form of a gel. In particular, such polymers comprise guluronic, galacturonic or glucuronic units, more generally uronic units, allowing the chelation of multivalent ions, in particular calcium ions which are present in large amount in dairy products.

Polymers for dietary use which may be used to prepare capsules in accordance with the invention include, for example, alginates, gellans and pectins, or mixtures of these polymers.

The capsules in accordance with the invention advantageously comprise at least 40%, preferably at least 45% and advantageously at least 60%, by weight of dairy product relative to the total weight of the capsule.

The dairy product encapsulated in the polymer envelope for dietary use described above may be a fermented or unfermented dairy product, and may be chosen in particular from yogurts, drinking yogurts, fermented milks, fromages frais, dessert creams and/or dairy mousses. Its texture may be very fluid (dairy product such as a drinking yogurt) or viscous (dairy product such as a stirred yogurt).

The capsules in accordance with the invention are prepared by placing the dairy product to be encapsulated in contact with a bath comprising, in aqueous solution, at least one polymer for dietary use which is reactive with multi-valent ions as defined above. The capsules formed are then recovered and may optionally be rinsed and then dried.

Depending on the nature of the dairy product which it is desired to encapsulate, two main variants of the process for preparing the capsules in accordance with the invention may be carried out.

According to a first variant, the placing in contact is carried out by dripping the dairy product to be encapsulated into the bath of dietary polymer.

To obtain capsules having the desired properties, the polymer which will be chosen in this case is one which has, as an aqueous 1% solution, a viscosity (measured at 25° C. and at 60 rpm) of less than 200 mPa·s and preferably less than 100 mPa·s.

Said polymer is advantageously selected from the group consisting or:

- highly gelling alanates with a molecular weight of less than or equal to 100 000 (commonly referred to as depolymerized alginates); these alginates are preferably selected from the group consisting of sodium alginates and potassium alginates;
- weakly acetylated gellans, and
- pectins with a degree of esterification of less than or equal to 20.

For the purposes of the present invention, the expression "highly gelling" means alginates whose guluronic acid content is greater than 50%, and the expression "weakly acetylated" means gellans whose maximum degree of substitution with acetyl groups is 0.03. As regards the degree of esterification of pectins, this corresponds to the percentage of galacturonic units of the pectins which bear a methoxyl group.

By way of example of implementation of this first variant of the process in accordance with the invention, the drops of dairy product may be formed using a rigid tube, the aperture diameter of which governs the diameter of the drops (typically from 2 to 15 mm) and which is located a few centimeters above the bath, for example 5–10 cm above it, the drop height of the drops being adjusted so that the dairy product fully enters the bath and so that the drops have a substantially spherical shape. To do this, the viscosity of the bath should be relatively low, preferably less than 200 mPa·s at 50 rpm.

The dairy product is advantageously at a temperature of from 4 to 10° C. and the bath is at a temperature of from 5 to 50° C. approximately. However, the bath temperature should not exceed 45° C. in the event that the dairy product is a yogurt, so as not to degrade the bacteria present in the yogurt.

The drops of dairy product are maintained in the bath for a time which is sufficient for a film of gel to form around these drops, by diffusion of the multivalent ions, in particular of the calcium ions present in the dairy product, this gel film being rigid enough to allow the capsules thus formed to be handled. The thickness of this gel film is typically from 0.1 to 0.5 mm and is set by the time of immersion in the bath (from 2 to 20 minutes approximately).

According to a second variant, the placing in contact is carried out by coextruding the dairy product with a solution of said polymer for dietary use. This variant allows the use of polymer solutions of high viscosity for which the technique of dripping the dairy product into the polymer solution can no longer be used. The viscosity of these solutions may be greater than 200 mPa·s.

Any one of the coextrusion techniques that are known per se for encapsulating food products, in particular pasty food products, may be used. By way of example, mention will be made of the techniques disclosed in patent DE 3 432 923, in international patent application WO 92/14544, in patent DE 2 402 415 or in the book: *Microcapsule Processing and Technology*, Marcel Dekker, Inc., Ch. 7, 59–63 (1979).

A jacketed tube is used: the dairy product is conveyed in the center, and the solution comprising at least one polymer for dietary use which is reactive with multivalent ions is conveyed at the periphery. Once they leave the inner tube, the drops of dairy product are immediately recovered from the polymer solution and are then introduced into a calcium chloride solution for a time which is sufficient for the gelation reaction to take place and for the envelope of the dairy product capsules to be strong enough to allow them to be handled.

The thickness of the envelope depends on the feed rates in the two tubes and on the respective viscosities of the dairy product and of the polymer solution.

In order to carry out this variant, a polymer solution for dietary use whose viscosity when it is used is about 1100–1200 mPa·s (measured at 25° C. and at 64 s$^{-1}$) is used, such a solution being runny and coating and spreading uniformly over the yogurt drop.

The polymer used is a polymer which is reactive with multivalent ions, chosen from highly gelling alginates, gellans and pectins with a degree of esterification of less than or equal to 20.

Whether the coextrusion technique or the drip technique is used, the polymer solution also advantageously comprises at least one compound selected from the group consisting of plasticizers, sugars, multivalent-ion sequestrants and water-retention agents.

The plasticizer is preferably selected from the group consisting of weakly gelling alginates with a molecular weight of less than or equal to 100000, pectins with a degree of esterification of between 20 and 50, sorbitol, glycerol, maltodextrins and polyols.

The expression "weakly gelling alginates" means alginates whose content of mannuronic acid, this moiety being unreactive with multivalent ions, is greater than 50%.

In a particularly advantageous manner, the presence of at least one plasticizer makes it possible to soften the network formed by the polymer for dietary use with the multivalent ions and thus allows the envelope to melt more satisfactorily in the mouth when it is consumed.

The plasticizer also prevents contraction of the film of polymer for dietary use which is formed and thus further limits the phenomenon of syneresis.

The optional presence of sugar ensures better dispersion of the macromolecules of polymer for dietary use during the preparation of the solution and allows the density of this solution to be adjusted; in addition, it modifies the taste of the gel constituting the envelope of the capsules.

The presence of a multivalent-ion sequestrant makes it possible to trap the excess multivalent ions which contribute toward the phenomenon of syneresis; the multivalent-ion sequestrant is preferably a calcium-ion sequestrant selected from the group consisting of citrates, phosphates, pyrophosphates and metaphosphates. Non-limiting examples which may be mentioned include tetrasodium pyrophosphate ($Na_4P_2O_7$), sodium hexametaphosphate ($Na_5(PO_3)_6$) and sodium citrate ($C_3H_4(OH)(COONa)_3$). As a variant, the sequestrant is present in the dairy product rather than in the polymer solution.

The presence of a water-retention agent makes it possible to limit the syneresis. Such an agent is preferably selected from the group consisting of carob and guar, these compounds being galactomannans extracted from the albumin of legume seeds.

When a water-retention agent is present in the case of capsules formed by the technique of dripping into the bath, said bath is maintained at a temperature which is sufficient to lower its viscosity to a value below 200 mPa·s; a suitable temperature is, for example, from 30 to 45° C.

The polymer solution advantageously comprises (expressed as percentages by weight relative to its total volume):

a) between 0.5% and 5% of polymer for dietary use which is reactive with multivalent ions;

b) between 0 and 10% of plasticizer;

c) between 0 and 2% of sequestrant; and d) between 0 and 2% and preferably between 0.4% and 2% of water-retention agent.

It may also contain between 0 and 20% of sugar.

According to one preferred embodiment of the process according to the invention, the step of recovering the capsules formed is followed by at least one rinsing of said capsules with deionized and/or sugary water, to remove the traces of non-crosslinked polymer remaining at the surface, thus preventing the reaggregation of the capsules after they have been packaged. For example, three successive rinsings may be carried out, followed by draining the capsules appropriately before they are packaged.

According to another preferred embodiment of the process according to the invention, the rinsing is followed by a step of drying said capsules. Such a drying operation makes it possible to evaporate off the water which is exuded at the surface of the capsules after they have been manufactured, and thus to eliminate any subsequent phenomenon of syneresis. It may be carried out, for example, by placing the capsules in contact with a flow of air for 30 minutes to 5 hours, for example at 4° C. (for example in a ventilated refrigerator).

The capsules which may be obtained by one or other of the variants of the process described above constitute preferred embodiments of the present invention.

The envelope of these capsules advantageously comprises, relative to the total dry weight of its various constituents:

a) between 10% and 100% by weight of polymer for dietary use which is reactive with multivalent ions;

b) between 0 and 90%, preferably between 0.5% and 10%, and advantageously at least 1% by weight of plasticizer;

c) between 0 and 30% by weight of multivalent-ion sequestrant;

d) between 0 and 50% of water-retention agent.

The capsules according to the present invention make it possible in particular to coat a fluid dairy product, such as a drinking yogurt or a fluid dessert cream. In addition, they are not particularly fragile and are thus easy to handle during industrial manufacture. These capsules may then be stored without further modification, without the need for a storage solution; they keep their spherical shape, and virtually only a small amount of syneresis is observed, which does not harm the storage.

In addition, the mouthfeel of the capsules in accordance with the invention is very pleasant. Unlike the capsules disclosed in Japanese patent application 62-130 645, the capsules in accordance with the invention are crunchy and release the yogurt, thus producing a sensation of freshness which consumers find very pleasant.

BRIEF DESCRIPTION OF THE DRAWINGS

In addition to the preceding arrangements, the invention also comprises other arrangements which will emerge from the description which follows, which refers to examples of implementation of the present invention, and also to the attached FIGS. 1 and 2 which illustrate, in the form of curves representing the force exerted on the capsule (in N) as a function of the deformation (compression) which said capsule undergoes (in mm), the breaking force of capsules according to the prior art (FIG. 1) and according to the present invention (FIG. 2).

It should be clearly understood, however, that these examples are given solely by way of illustration of the subject of the invention, of which they do not in any way constitute a limitation.

EXAMPLE 1

Figure 1:
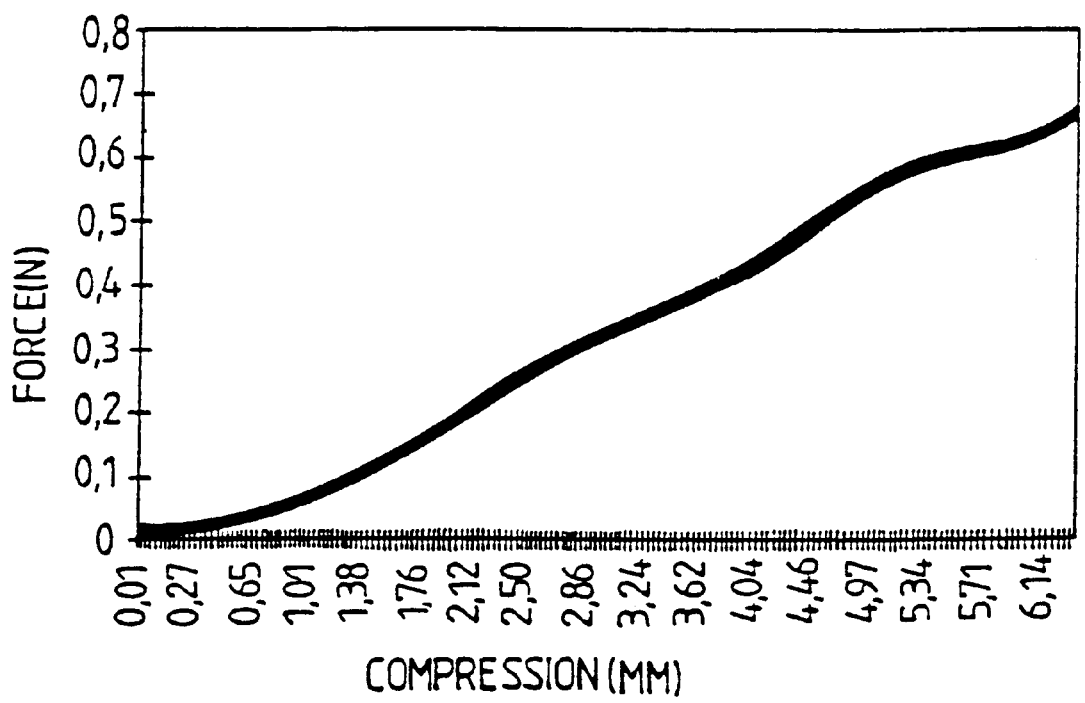

CHEMICAL COMPOSITION, PHYSICAL AND ORGANOLEPTIC CHARACTERISTICS OF VARIOUS CAPSULES ACCORDING TO THE INVENTION, IN THE ABSENCE OF PLASTICIZER IN THE ENVELOPE OF SAID CAPSULES

The capsules were manufactured according to the process of dripping into a bath according to the invention. All the viscosity measurements indicated below were carried out using a Brookfield RVT visco-meter, at a speed of 50 rpm.

The drops of dairy product, 10 mm in diameter, are formed using a rigid tube placed about 5 cm above the immersion bath, said bath being at a temperature of 25° C. Once formed, and after the immersion time indicated in Table 1 below, the capsules are recovered and rinsed three times with deionized water.

The dairy product used is a fluid yogurt whose viscosity at 10° C., measured at 64 s$^{-1}$, is 900 mPa·s. Its temperature, at the time or dripping into the immersion bath, is about 5° C.

The alginate used is highly gelling. It is a sodium alginate which has a molecular weight of about 90000 daltons and a viscosity as an aqueous 1% solution, measured at 60 rpm and at 20° C., of 75 mPa·s, and which is sold by the company Nutrasweet Kelco (Monsanto) under the name Manugel GHB, or by tile company SKW Biosystems under the name Satialgine SG80. The pectin used is sold, for example, by the company Hercules under the name Genu Pectin LM5CS. It has high gelling capacity, a degree of esterification of 10% and a viscosity as an aqueous 4% solution, measured at 50 rpm and at 20° C., of about 100 mPa·s.

Table 1 summarizes, for two capsules (1) and (2), the composition of the immersion bath (w/v of aqueous solution), the immersion time (min), the percentage of yogurt encapsulated (total w/w of the capsule) and the percentage of syneresis, measured by weighing the serum exuded by an amount of 50 to 70 g of capsules after storage for 24 h at 4° C. in a closed container.

TABLE 1

| Capsule No. | Composition of the immersion bath | Immersion time (min) | % of yogurt | % syneresis |
|---|---|---|---|---|
| (1) | 1.5% alginate 10% sugar | 5 | 71.1 | 23.4 |
| (2) | 4% pectin 5% sugar | 10 | 75.3 | 11.3 |

Capsules (1) and (2) are not particularly fragile and are crunchy when consumed.

EXAMPLE 2

CHEMICAL COMPOSITION, PHYSICAL AND ORGANOLEPTIC CHARACTERISTICS OF VARIOUS CAPSULES ACCORDING TO THE INVENTION, A PLASTICIZER BEING PRESENT IN THE ENVELOPE OF SAID CAPSULES

The capsules were obtained by the dripping technique as described in Example 1.

The dairy product, the pectin and the alginate are the same as in Example 1. However, the formulations given below comprise, in addition to the alginates and pectins of Example 1, other types of alginates and of pectins that are weakly gelling, referred to as "alginate M" and "pectin LM".

Alginate M is a sodium alginate with a molecular weight of about 18000 daltons, sold by the company Nutrasweet Kelco under the name Manucol LB, Pectin LM ("low methoxyl"), sold by the company Hercules under the name Genu Pectin LM 105-AS, is a pectin with a 46% degree of esterification and a 9% degree of amidation.

As regards the glycerol present in capsule (4) (see Table 2), it may be obtained, for example, from the company Louis Francois under the reference "glycerol alimentaire [food-grade glycerol]".

Table 2 summarizes, for three capsules (3) to (5), the composition of the immersion bath (w/v of aqueous solution), the immersion time (min), the percentage of yogurt encapsulated (total w/w of the capsule) and the percentage of syneresis measured according to the procedure described in Example 1.

TABLE 2

| Capsule No. | Composition of the immersion bath | Immersion time (min) | % of yogurt | % syneresis |
|---|---|---|---|---|
| (3) | 0.75% alginate 1.5% pectin LM 10% sugar | 10 | 60.1 | 13.0 |
| (4) | 1.5% pectin 0.75% alginate 5% glycerol 5% sugar | 10 | 66.9 | 12.9 |
| (6) | 1.5% pectin 0.2% alginate 2.5% alginate M 10% sugar | 7 | 69.7 | 10.0 |

The capsules are rigid enough to be able to be handled without breaking, capsules (3) and (4) being the most solid. When consumed, capsules (3) and (4) have a good crunchy texture, whereas capsule (5) is softer. The "grape skin" effect is attenuated for all of the capsules (3) to (5), the gel being least perceptible in formulation (5).

EXAMPLE 3

MANUFACTURE OF YOGURT CAPSULES BY COEXTRUSION.

a) Composition of the Polymer Solution

The solution which is used to form the envelope of the capsules has the following composition:

2% w/V of pectin LM 5CS (see Example 1);

0.9% w/V of highly gelling alginate (see Example 1);

0.45% w/V of carob;

5% w/V of sugar.

This solution is used at 20° C., which corresponds to a viscosity of 1100–1200 mPa·s (viscosity measured using a Brookfield viscometer at 50 rpm).

b) Yogurt Used

A yogurt with a viscosity of 1400 to 1650 mPa·s at 10° C. (viscosity measured using a Rheomat 108 visco-meter at 64 $s_{-1}$) is used. During the coextrusion process presented in this example, the yogurt is used at a temperature of 4 to 6° C.

c) Process Used

The coextruder used to obtain the yogurt capsules presented in this example consists of 2 concentric tubes:

the yogurt is conveyed, by means of a peristaltic pump, in the inner tube, 4 mm in diameter, at a flow rate of 660 to 1080 g/hour;

the biopolymer solution described above is conveyed, with the aid of another peristaltic pump, in the outer tube, 8 mm in diameter and forming a 1 mm gap with the inner tube, at a flow rate of 1200 to 1500 g/hour.

The ends of the 2 tubes are not positioned at the same level: the outer tube protrudes by about 5 mm relative to the inner tube, to prevent obstruction or the spurting exit of the yogurt in contact with the biopolymer solution.

The yogurt drops are formed at the outlet of the inner tube of the coextruder, under the effect of gravity. They are instantaneously coated with the biopolymer solution coming from the outer tube.

The drops thus preformed fall, by a height of 10 to 12 cm (calculated to obtain spherical beads), into a 2% calcium chloride solution, at room temperature. 1 to 2 minutes of immersion in this solution allow the calcium ions contained in the yogurt and the immersion solution to diffuse into the envelope of the beads and complete the gelation (hardening of the envelope).

The beads are then extracted from the calcium chloride solution using a screen and are rinsed in 3 successive baths of deionized water, which makes it possible to prevent reaggregation of the beads after they have been packaged and to rinse off the excess calcium chloride. After the final rinsing, the beads are drained and then packaged.

d) Physical and Organoleptic Characteristics of the Beads Obtained by Coextrusion The beads obtained are 10 to 11 mm in diameter with an envelope 0.7 to 1.5 mm thick. They comprise from 40 to 45% yogurt and from 55 to 60% gel (envelope), these percentages being expressed relative to the total weight of the capsule.

The degree of syneresis measured 48 hours after manufacturing the capsules is 6 to 10%; it is 10 to 12% after 7 days.

An observation of the capsules after 48 hours reveals that they are not particularly fragile, are crunchy and do not have a "grape skin" effect. The gel releases the yogurt satisfactorily after the capsule has been burst.

EXAMPLE 4

COMPARISON OF THE BREAKING STRENGTH OF YOGURT CAPSULES ACCORDING TO THE INVENTION AND OF CAPSULES OF THE PRIOR ART.

A uniaxial compression test was carried out in order to measure the behavior of capsules subjected to a pressure.

The capsules used are, on the one hand, capsules obtained according to Example 2 above, and, on the other hand, capsules of the prior art obtained according to Example 1 of the Japanese patent application in the name of Meiji Milk Prod. Co. Ltd., published under No. 62-130 645. In both cases, these capsules are 10 mm in diameter.

The uniaxial compression test consists in placing a capsule on a horizontal flat surface and in compressing it using a horizontal plate, whose diameter is greater than that of the capsule, which moves vertically by pressing on said capsule. This plate is fitted with a sensor which measures the force exerted on the capsule at any moment. Such a device is available, for example, from the company Adamel Lhomargy under the name DY20. The speed of displacement of the plate used is 200 mm/min.

Figure 2:
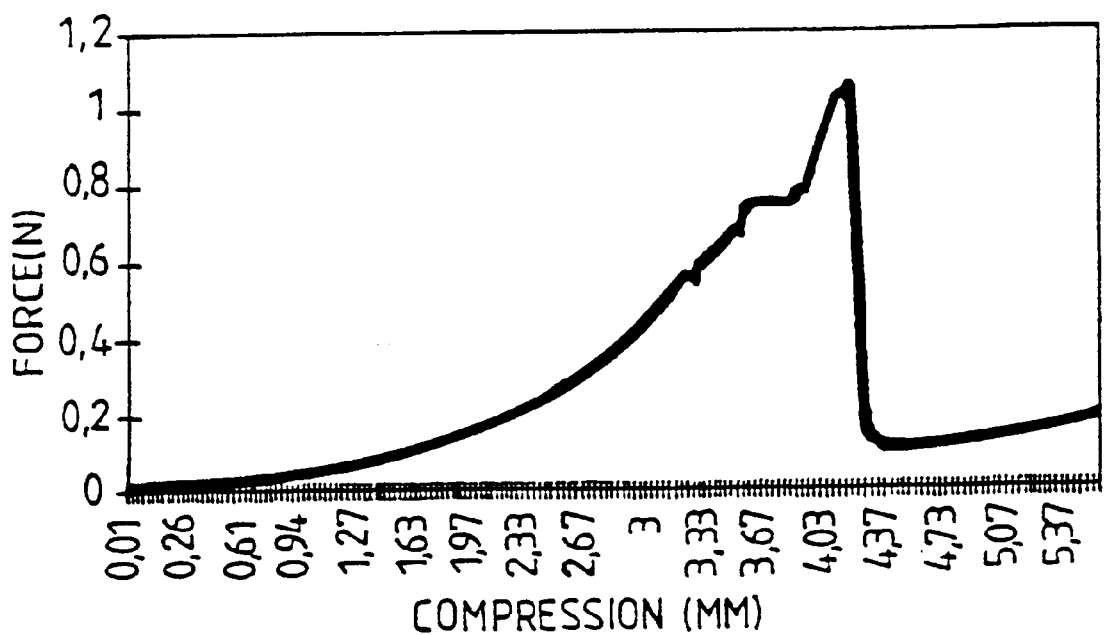

FIG. 1 represents the behavior of the capsules of the prior art and FIG. 2 represents that of the capsules according to the present invention, the compression (in mm) being shown on the x-axes and the force applied (in Newtons) being shown on the y-axes.

For the capsules of the prior art, a substantially linear curve profile is observed, which reflects a gradual crushing of the capsule, which takes the shape imposed upon it and therefore does not withstand the compression. This is a behavior of "liquid" type: a 30% reduction in the diameter of the capsules is observed from 0.3 N, and the capsules then continue to be flattened and to be deformed without breaking.

On the other hand, for the capsules prepared according to the present invention (FIG. 2), the curve shows an exponential shape, the capsules withstanding a pressure of 1 N and being deformed only by about 30% relative to their initial size. Next, if the applied force increases, the curve shows a clean break, which reflects the rupture of the capsule.

It thus emerges that the capsules according to the invention have elastic behavior: they greatly withstand deformation up to rupture of the envelope. In general, the capsules according to the invention have a breaking force of greater than 0.5 N. Depending on the desired mouthfeel, this breaking force may range from 0.5 to 1.5 N.

What is claimed is:

1. A process for manufacturing a capsule comprising an envelope comprising at least one polymer, inside which is confined a dairy product, wherein the capsule has a breaking force of greater than 0.5 N, the process comprising the following steps:

a) preparing an aqueous solution of at least one polymer suitable for dietary use which is reactive with multivalent ions, said polymer selected from the group consisting of i) highly gelling alginates with a molecular weight of less than or equal to 100,000, ii) weakly acetylated gellans and iii) pectins with a degree of esterification of less than or equal to 20, and at least one compound selected from the group consisting of plasticizers, sugars, multivalent-ion sequestrants and water-retention agents;

b) placing the dairy product in contact with said solution; and c) recovering the capsules formed.

2. The process as claimed in claim 1, wherein said placing in contact is carried out by coextruding said dairy product with said solution.

3. The process as claimed in claim 1, wherein said placing of the dairy product in contact with said solution is carried out by dripping said dairy product into a bath of said solution.

4. The process is claimed in claim 3, wherein said polymer for dietary use has, as an aqueous 1% solution, a viscosity at 25° C. and at 60 rpm of less than 200 mPa·s.

5. The process as claimed in claim 1, wherein the plasticizer is selected from the group consisting of weakly gelling alginates with a molecular weight of less than or equal to 100,000, pectins with a degree of esterification of between 20 and 50, sorbitol, glycerol, maltodextrins and polyols.

6. The process as claimed in claim 1, wherein the multivalent-ion sequestrant is a calcium-ion sequestrant selected from the group consisting of citrates, phosphates, pyrophosphates and metaphosphates.

7. The process as claimed in claim 1, wherein, the water-retention agent is selected from the group consisting of carob and guar.

8. The process as claimed in claim 1, wherein the polymer solution comprises, expressed as percentages by weight relative to the total volume of said solution:

(a) between 0.5% and 5% of polymer suitable for dietary use which is reactive with multivalent ions;

(b) between 0 and 10% of plasticizer;

(c) between 0 and 2% of sequestrant; and (d) between 0 and 2% of water-retention agent.

9. The process as claimed in claim 1, wherein the step of recovering the capsules formed is followed by at least one rinsing of said capsules with deionized water, sugary water, or mixtures thereof.

10. The process as claimed in claim 9, wherein the rinsing is followed by a step of drying said capsules.

* * * * *